US011898310B2

(12) United States Patent
Vuorio et al.

(10) Patent No.: US 11,898,310 B2
(45) Date of Patent: Feb. 13, 2024

(54) DEVICE FOR MECHANICALLY PROCESSING LIGNOCELLULOSE-CONTAINING FIBROUS MATERIAL

(71) Applicant: Valmet Technologies Oy, Espoo (FI)

(72) Inventors: Petteri Vuorio, Espoo (FI); Håkan Sjöström, Espoo (FI)

(73) Assignee: Valmet Technologies Oy, Espoo (FI)

( * ) Notice: Subject to any disclaimer, the term of this patent is extended or adjusted under 35 U.S.C. 154(b) by 408 days.

(21) Appl. No.: 17/432,458

(22) PCT Filed: Feb. 18, 2020

(86) PCT No.: PCT/FI2020/050101
§ 371 (c)(1),
(2) Date: Aug. 19, 2021

(87) PCT Pub. No.: WO2020/169884
PCT Pub. Date: Aug. 27, 2020

(65) Prior Publication Data

US 2022/0145537 A1 May 12, 2022

(30) Foreign Application Priority Data

Feb. 20, 2019 (FI) ..................................... 20195130

(51) Int. Cl.
*D21D 1/30* (2006.01)
*B02C 7/12* (2006.01)

(52) U.S. Cl.
CPC ............... *D21D 1/306* (2013.01); *B02C 7/12* (2013.01); *D21D 1/30* (2013.01); *D21D 1/303* (2013.01)

(58) Field of Classification Search
CPC . B02C 7/12; D21D 1/30; D21D 1/303; D21D 1/306; D21D 1/008
See application file for complete search history.

(56) References Cited

U.S. PATENT DOCUMENTS

2010/0314476 A1 12/2010 Vuorio

FOREIGN PATENT DOCUMENTS

| | | | |
|---|---|---|---|
| CN | 104492541 | A | 4/2015 |
| EP | 1806450 | A1 | 7/2007 |
| EP | 1806451 | A1 | 7/2007 |

(Continued)

OTHER PUBLICATIONS

International Search Report for PCT/FI2020/050101, dated Apr. 23, 2020.

(Continued)

*Primary Examiner* — Faye Francis
(74) *Attorney, Agent, or Firm* — Stiennon & Stiennon

(57) ABSTRACT

A processing plate (4, 12) for mechanically processing pulp. The plate has projecting parts (6, 7, 14, 15). The projecting parts (7, 15) have a radially inner part (28) having an inclined ascending wall (29) towards the outer periphery (23) of the plate and a radially outer part (30) having an inclined descending wall (31) towards the outer periphery (23) of the plate (4, 12). The inner and outer parts (28, 30) are radially coupled to each other by a ridge (32) along a coupling line (CL). The walls (29, 31) are mutually connected only partly so that they have in common only a crest section (40) of the ridge (32) which crest section (40) is less than a width of at least one of the wall (29) of the inner part (28) and the wall (31) of the outer part (30) at the coupling line (CL).

20 Claims, 4 Drawing Sheets

(56) References Cited

FOREIGN PATENT DOCUMENTS

| | | | |
|---|---|---|---|
| EP | 2689853 | A1 | 1/2014 |
| WO | 2016027019 | A1 | 2/2016 |
| WO | 2017001359 | A1 | 1/2017 |

OTHER PUBLICATIONS

Written Opinion of the International Searching Authority for PCT/FI2020/050101, dated Apr. 23, 2020.

DEVICE FOR MECHANICALLY PROCESSING LIGNOCELLULOSE-CONTAINING FIBROUS MATERIAL

CROSS REFERENCES TO RELATED APPLICATIONS

This application is a 371(c) national state application based on PCT/FI2020/050101 filed on Feb. 18, 2020, and claims priority on Finnish Application No. FI20195130 filed on Feb. 20, 2019, the disclosures of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a device for mechanically processing lignocellulose-containing fibrous material, such as to a disperser for dispersing pulp made of recycled lignocellulose-containing fibrous material, or to a high or medium consistency refiner for defibration of lignocellulose-containing fibrous material to produce refined pulp. More particularly the invention relates to a processing plate for mechanically processing lignocellulose-containing fibrous material, such as to a disperser plate for the disperser for dispersing pulp made of recycled lignocellulose-containing fibrous material or to a refiner plate for defibrating of lignocellulose-containing fibrous material to produce refined pulp.

Recycling of waste paper and packaging material as a source of raw material to new fiber-based products has long traditions, however its importance has increased in these days in terms of environment, energy and sustainability. Several processes are used to remove ink, tone, plastics, and stickies etc. which are present in the recovered paper.

When paper or paperboard is manufactured from pulp, and especially from pulp containing recycled fibers originating for example from wastepaper, chipboard, or waste pulp, it is an intention to process different contaminants in the pulp before a formation of a paper web or a board web so that negative effects of the contaminants to the pulp as well as to a web forming in a paper or board machine are reduced. Said contaminants include for example printing inks and surface coating agents, such as different stickies, waxes, adhesives, and pastes, remaining in the wastepaper, chipboard, or waste pulp.

Dispersing of the pulp does not actually remove the contaminants from the pulp but in the dispersing the pulp is slushed or treated in order to diminish negative effects of the contaminants to a quality and a runnability of the pulp or to facilitate a removal of the contaminants in process stages following the dispersing. In the dispersing, among other things, contaminants such as printing ink particles attached to the fibers are detached from the fibers and made smaller so that they can be easily removed from the pulp in a flotation stage following the dispersing or, alternatively, to prevent them being visible in a finished paper or paperboard at least by visual examination. In the dispersing also sticky particles remaining in the pulp are broken up in order to prevent a formation of different contaminant aggregates which may have negative effects on the runnability of the pulp during the formation of the paper or board web and on the runnability of the formed paper or board web in an actual paper or board machine. Dispersing does not actually cut or break the fibers but helps to release fibers from the contaminants and to reduce particulate size of stickies.

A typical disperser comprises coaxial oppositely positioned disperser discs having either disc-like or conical forms and providing a stator and a rotor of the disperser, the rotor being arranged to be rotated relative to the fixed stator. On the stator and the rotor there are disperser plates arranged in a removable way, the disperser plates providing dispersing surfaces of the stator and the rotor, whereby the dispersing surfaces of the stator and the rotor may consist of a single disperser plate extending over the whole perimeter of the stator/rotor but typically they consist of several pie-shaped disperser plates, i.e., segments, arranged adjacent to one another to form the complete dispersing surface. The dispersing surface comprises projecting parts, teeth or the like, and cavities which may be grooves but most often being planar areas between the projecting parts. The projecting parts and the cavities therebetween provide processing surfaces, i.e., dispersing surfaces, of the disperser plates. The dispersing surfaces of one or more disperser plates attached to the disc-like or conical stator/rotor thus provide the dispersing surface of the disc-like or conical stator/rotor.

The projecting parts in a typical disperser plate are pyramidal shaped discrete parts comprising a radially inner part having an inclined ascending wall towards the outer periphery of the disperser plate and a radially outer part having an inclined descending wall towards the outer periphery of the disperser plate, the radially inner and outer parts being connected at a ridge therebetween. The projecting parts are arranged in a number of concentric annular rows at different radial distances in the disperser plate, the projecting parts being at a distance from each other in that annular row. The cavities comprise thereby concentric annular open areas between the concentric annular rows of the projecting parts as well as radial groove-like open areas between the individual projecting parts in the annular rows of the projecting parts. In the disperser the projecting parts and the cavities in the oppositely positioned stator/rotor are then arranged to intermesh with each other such that the projecting parts in the annular rows in the stator plate extend into the annular open areas in the opposite rotor plate and vice versa as male-female elements. Dispersers of this kind are shown for example in WO-publication 2017/001359 A1 and EP1806451 B1.

When the disperser discs of the disperser are rotated relative to each other, the pyramidal shaped discrete projecting parts in the stator and rotor cause impacts to the pulp to be dispersed, whereby effects of these impacts together with effects of internal friction in the pulp detach the contaminant particles from the pulp and break them up into smaller pieces.

Similarly, a refiner is used to mechanically process lignocellulose-containing fibrous material between a pair of plates at least one of which is rotating to produce refined pulp for making paper or board products of different grades or for making fiber board.

SUMMARY OF THE INVENTION

An object of the present invention is to provide a novel device for mechanically processing lignocellulose-containing fibrous material, such as a novel disperser and a novel disperser plate for a disperser as well as a novel refiner and a novel refiner plate for the refiner.

The processing plate according to the invention has a projecting part with inclined walls which are mutually connected only partly so that they have in common only a crest section.

The device for mechanically processing lignocellulose-containing fibrous material according to the invention is a device comprising at least two oppositely positioned processing discs, at least one of the processing discs being arranged to be rotated relative to the at least one other processing disc, each processing disc comprising at least one processing plate attached to the processing discs with a processing surface provided with projecting parts having inclined walls which are mutually connected only partly so that they have in common only a crest section.

The invention is based on the idea of arranging a first part and a second part in a projecting part and the inclined walls thereof such that at least the inclined walls are dislocated relative to each other in the circumferential direction of the plate.

An advantage of the arrangement, in the disperser application, is that a number of course changing points for the flowing pulp is increased, thus increasing points or surfaces against which the flowing pulp may collide and cause the contaminant particles in the pulp to be broken into smaller pieces by the effects of these impacts and an internal friction in the pulp, or which points or surfaces may direct the pulp to be dispersed towards the dispersing chamber and the opposite disperser disc. Similar effects may also be achieved in defibration of wood chips in a refiner, especially in a medium or high consistency refiner, wherein the increased number of course changing points for the flowing fibrous material provides a more effective intermingle of the material and more cutting edges for the chips and fiber bundles to collide, thereby increasing an efficiency of the defibration of the lignocellulose-containing fibrous material.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DESCRIPTION OF THE PREFERRED EMBODIMENTS

Figure 1:
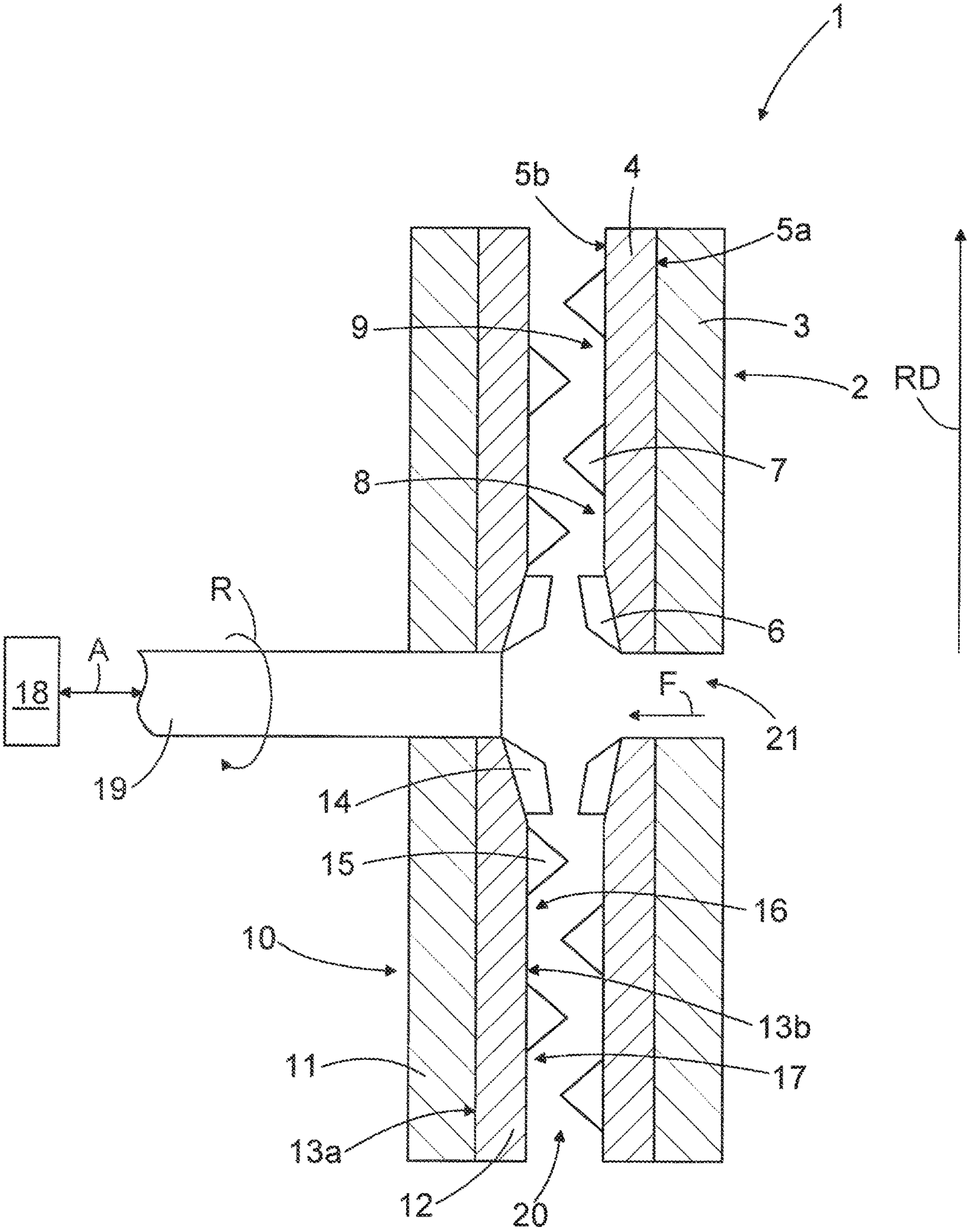
FIG. 1 is a schematic cross-sectional side view of a disperser.

FIG. 1 is a schematic cross-sectional side view of a disperser 1 which may be used for dispersing fibrous material, i.e., pulp, and especially pulp containing recycled fibers originating for example from wastepaper, chipboard or waste pulp. An intention of the dispersing is to treat the pulp so that contaminants are released from the fibers so that they can be easily removed from the pulp in a flotation stage following the dispersing or, alternatively, to prevent them being visible in a finished paper or paperboard at least by visual examination. Said contaminants include for example printing inks and surface coating agents, such as different stickies, waxes, adhesives and pastes, remaining in the wastepaper, chipboard or waste pulp. Generally, the disperser comprises two oppositely positioned disperser discs at least one of which is rotating. In the following the disperser 1 with one rotating disperser disc is described.

The disperser 1 shown in FIG. 1 comprises a stationary, fixed disperser disc 2, i.e., a stator 2 of the disperser 1. The stationary disperser disc 2 comprises a body 3, which may be part of a fixed frame (not shown) of the disperser 1 or a body element being detachably fastened to the fixed frame of the disperser 1. The stationary disperser disc 2 comprises a number of, i.e., one or more, disperser plates 4 of the stationary disperser disc 2, the at least one disperser plate 4 being detachably fastened to the body 3 of the stationary disperser disc 2, whereby a worn or broken disperser plate 4 may be replaced with a new one.

The disperser plate 4 comprises a background surface **5*a* facing to the body 3 of the stationary disperser disc 2 and a front surface 5*b* facing away from the body 3 of the stationary disperser disc 2. The front surface 5*b* comprises a number of first projecting parts 6 and second projecting parts 7 extending upwards from a bottom of the front surface 5*b* of the disperser plate 4, as well as cavities 8 or open areas 8 between the projecting parts 6, 7 in a radial direction RD of the disperser plate 4 or of the stationary disperser disc 2. The front surface 5*b* of the disperser plate 4 together with the projecting parts 6, 7 and the cavities 8 or open areas 8 provide a processing surface 9, i.e., a dispersing surface 9 of the disperser plate 4. A complete processing surface, i.e., a dispersing surface of the stationary disperser disc 2 is formed by the dispersing surfaces 9 of a necessary number of the disperser plates 4 fastened next to each other in the stationary disperser disc 2 so that the complete dispersing surface extending over the whole circumference of the stationary disperser disc 2** is provided.

The disperser 1 shown in FIG. 1 further comprises a rotatable, i.e., movable, disperser disc 10, i.e., a rotor 10 of the disperser 1. The rotatable disperser disc 10 comprises a body 11, which is connected to a motor 18 by a shaft 19 so that the rotatable disperser disc 10 can be rotated relative to the stationary disperser disc 2 in a direction of arrow R, for instance, the arrow R thus indicating an intended rotation direction R of the rotatable disperser disc 10. The disperser may also comprise a loader which, for the sake of clarity, is not shown in FIG. 1. The loader can be used for moving back and forth the rotatable disperser disc 10 attached to the shaft 19, as schematically shown by arrow A, in order to adjust a size of a dispersing gap 20 or a dispersing chamber 20 between the stationary 2 and the rotatable 10 disperser discs.

The rotatable disperser disc 10 comprises a number of, i.e., one or more, disperser plates 12 of the rotatable disperser disc 10, the at least one disperser plate 12 being detachably fastened to the body 11 of the rotatable disperser disc 10, whereby a worn or broken disperser plate 12 may be replaced with a new one. The disperser plate 12 comprises a background surface **13*a* facing to the body 11 of the rotatable disperser disc 10 and a front surface 13*b* facing away from the body 11 of the rotatable disperser disc 10. The front surface 13*b* comprises a number of first projecting parts 14 and second projecting parts 15 extending upwards from the front surface 13*b* of the disperser plate 12, as well as cavities 16 or open areas 16 between the projecting parts 14, 15 in the radial direction RD of the disperser plate 12 or of the rotatable disperser disc 10. The front surface 13*b* of the disperser plate 12 together with the projecting parts 14**, 15 and the cavities 16 or open areas 16 provide a processing surface 17, i.e., a dispersing surface 17 of the disperser plate 12. A complete processing surface, i.e., a dispersing surface of the rotatable disperser disc 10 is formed by the dispersing surfaces 17 of a necessary number of the disperser plates 12 fastened next to each other in the rotatable disperser disc 10 so that the complete dispersing surface extending over the whole circumference of the rotatable disperser disc 10 is provided.

The disperser 1 further comprises at the stationary disperser disc 2 at least one feed opening 21 through which the pulp to be dispersed is supplied into the dispersing chamber 20 along a feed or supply direction indicated schematically with an arrow F. Consistency of the pulp supplied into the disperser 1 may for example be 3-40%, preferably 10-30%. Together with the pulp also steam may be supplied into the dispersing chamber 20 so as to improve the travel of the pulp in the dispersing chamber 20 along the dispersing surfaces of the disperser discs 2, 10. The projecting parts 6, 7, 14, 15 provide the parts of the dispersing surfaces of the stationary 2 and rotatable 10 disperser discs that direct a dispersing effect to the pulp by the stationary 2 and the rotatable 10 disperser discs. The cavities or open areas 8, 16 provide free volumes intended to receive the projecting parts 14, 15 projecting from the opposed disperser disc 2, 10.

The disperser 1 shown in FIG. 1 is an example of a disc disperser with plate-like disperser discs. However, the solutions presented herein, either above or below, may also be utilized in conical dispersers with conical-like disperser discs. Furthermore, in the disc disperser 1 as well as in the conical disperser the stationary disperser disc 2 may be replaced with another rotatable disperser disc that is arranged to be rotated into a direction opposite to the intended rotation direction R of the rotatable disperser disc 10.

Figure 2:
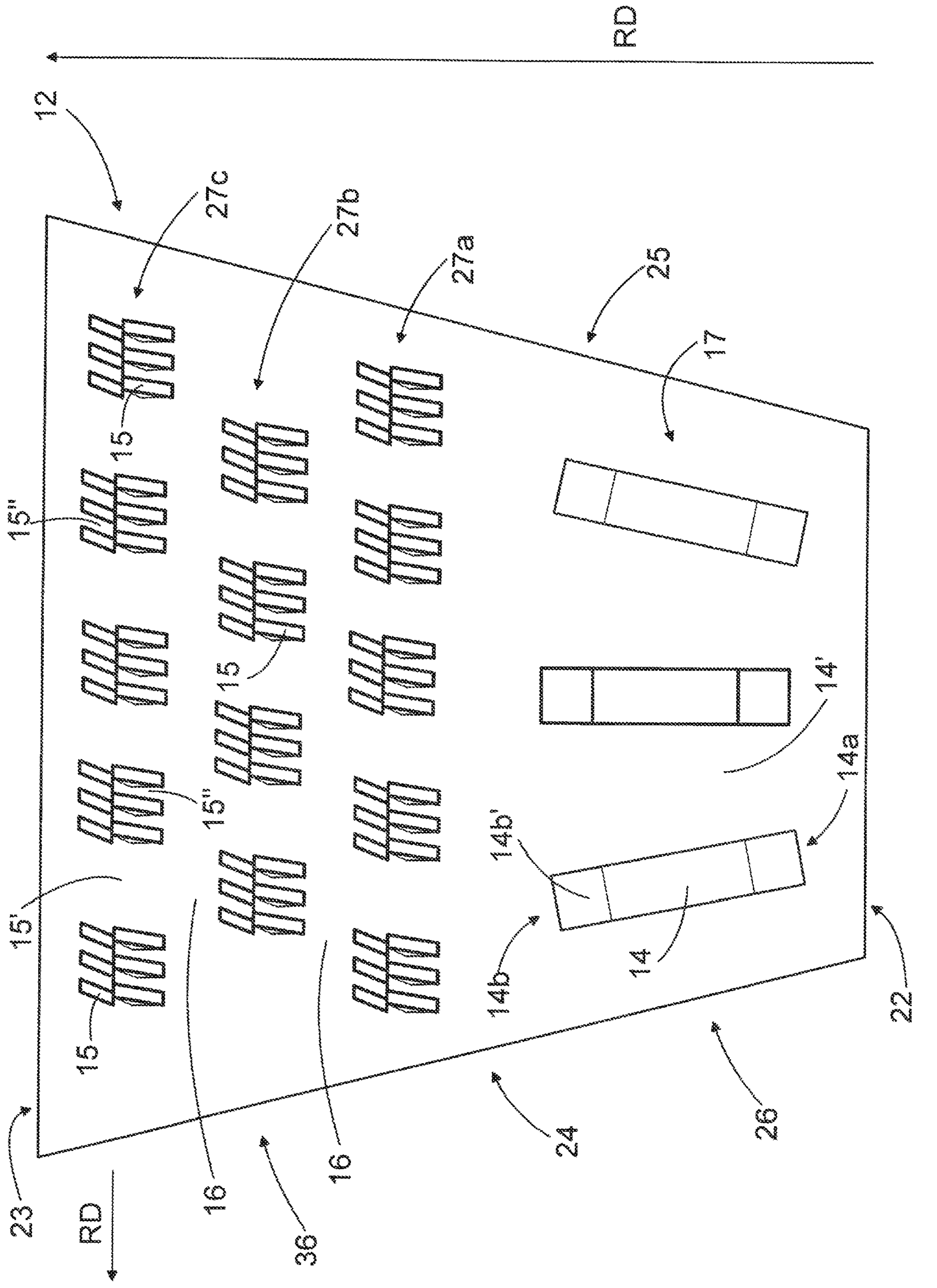
FIG. 2 shows schematically a disperser plate for a disperser.
Figure 3A:
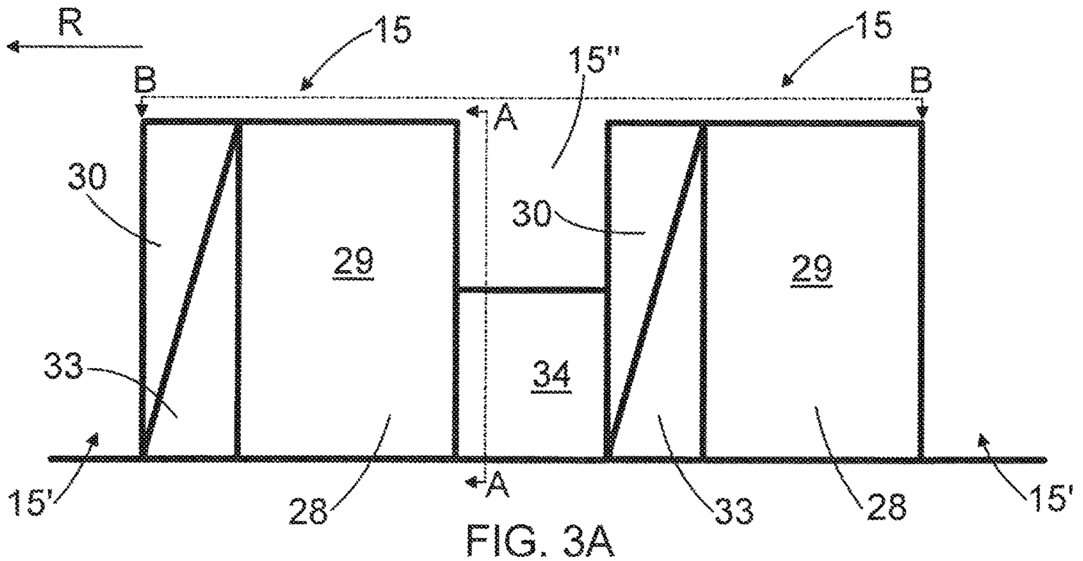
FIGS. 3A, 3B and 3C show schematically projecting parts used in the disperser plate of FIG. 2.
Figure 3B:
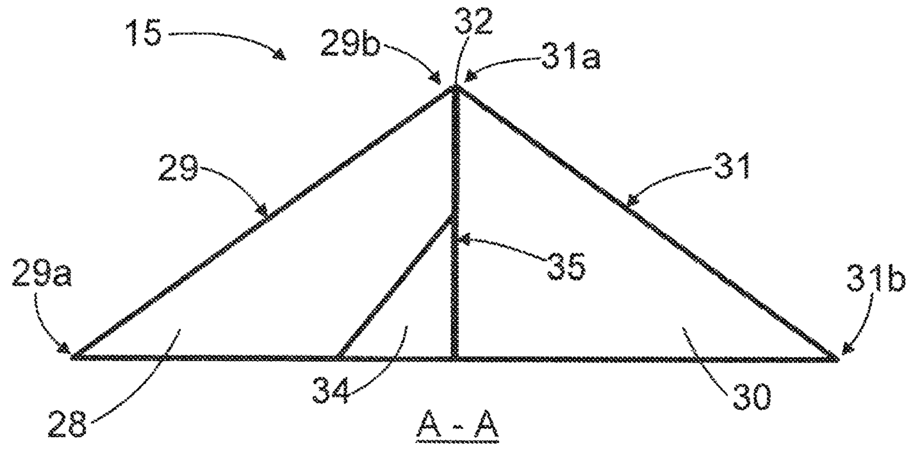
Figure 3C:
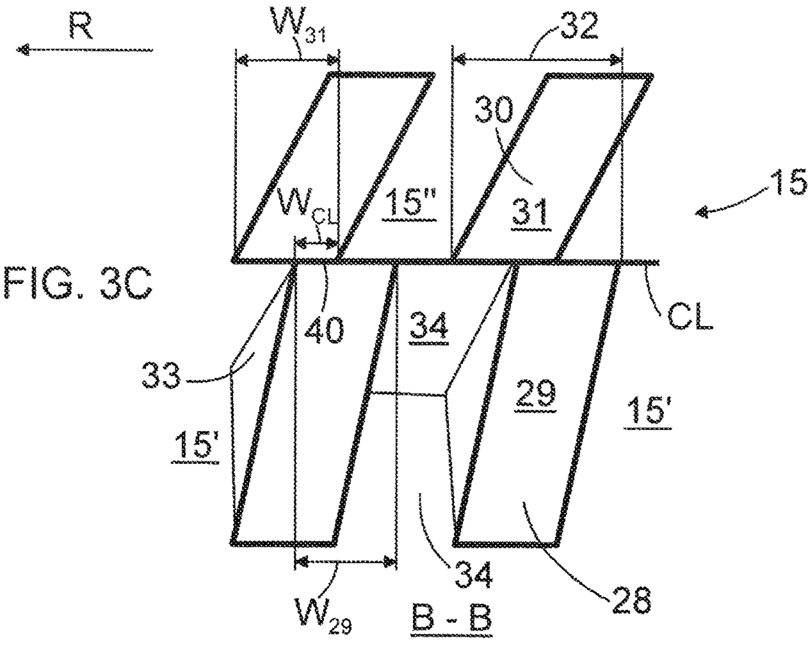
Figure 4:
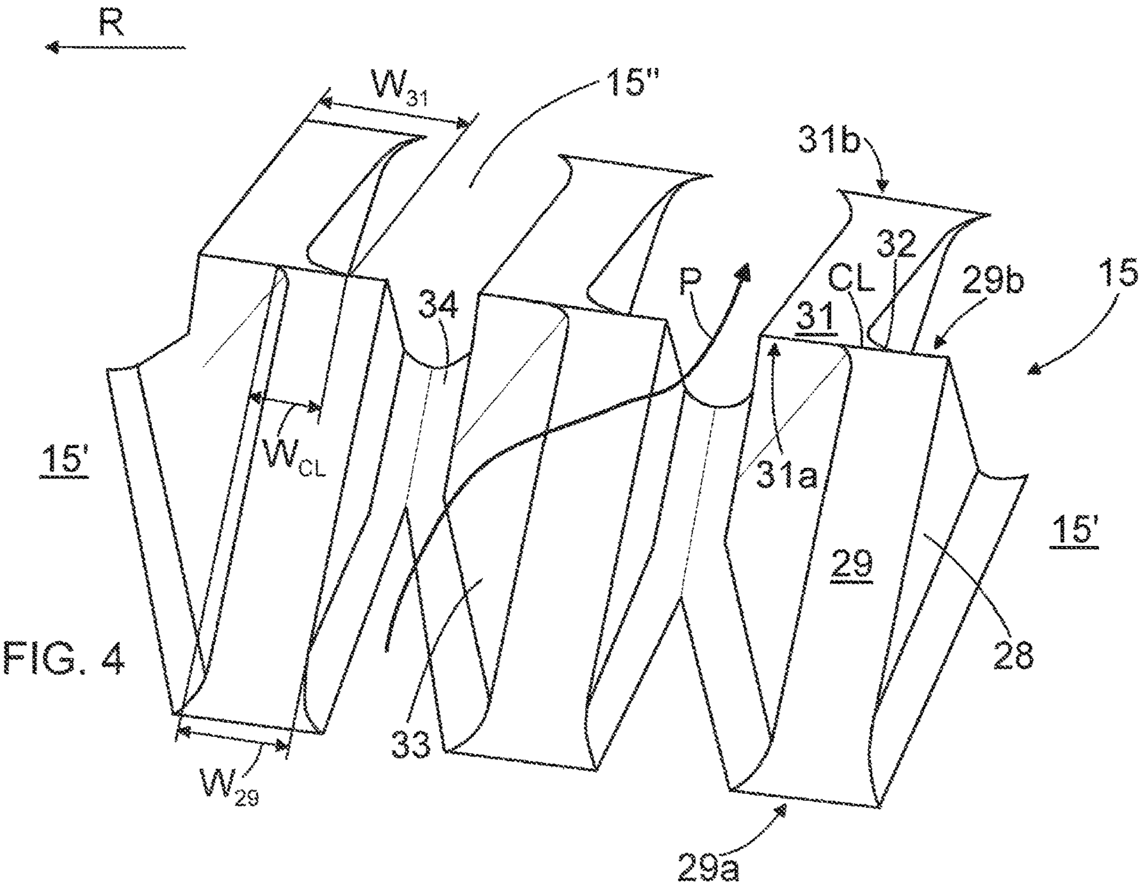
FIG. 4 shows schematically another embodiment of the projecting parts.

FIG. 2 shows schematically a view of a disperser plate 12 for a rotatable disperser disc 10 of the disperser 1 shown above, i.e., a view of the front surface 13*b* of the disperser plate 12 of the disperser 1. FIGS. 3A, 3B, 3C show schematically some second projecting parts 15 of the disperser plate 12 of FIG. 2 in more detail and FIG. 4 shows schematically another possible embodiment of the second projecting parts 15 of the disperser plate 12. The disperser plate 4 of the stationary disperser disc 2 of the disperser 1 of FIG. 1 and the dispersing surface 9 thereof including the projecting parts therein may be substantially a reversed image to that shown in FIGS. 2, 3A, 3B, 3C, 4 unless otherwise specifically expressed.

The disperser plate 12 of FIG. 2 is a disc-like disperser plate comprising an inner edge 22 or an inner periphery 22 or a feed edge 22 intended to be directed towards a center of the rotatable disperser disc 10, i.e., towards the feed opening 21 in the disperser 1. The pulp to be dispersed thus enters to the dispersing surface 17 of the disperser plate 12 over the inner edge 22. The disperser plate 12 further comprises an outer edge 23 or an outer periphery 23 or a discharge edge 23 intended to be directed towards an outer periphery of the rotatable disperser disc 10, i.e. away from the feed opening 21 of the disperser 1. The disperser plate 12 further comprises a first side edge 24 and a second side edge 25 extending between the inner edge 22 and the outer edge 23, the first side edge 24 intended to face to the intended rotation direction R of the rotatable disperser disc 10 and the second side edge 25 intended to face to the direction opposite to the intended rotation direction R of the rotatable disperser disc 10. The disperser plate 12 is a segment-like disperser plate intended to provide a part of a complete dispersing surface of the rotatable disperser disc 10, whereby the complete dispersing surface of the rotatable disperser disc 10 is provided by setting a number of the segment-like disperser plates adjacent to each other.

The disperser plate 12 of FIG. 2 comprises a dispersing surface 17 comprising elongated first projecting parts 14 arranged next to the inner periphery 22 of the disperser plate 12 and extending from the direction of the inner periphery 22 towards the outer periphery 23. The first projecting part 14 has a first end 14*a* facing to the inner periphery 22 of the disperser plate 12 and a second end 14*b* facing to the outer periphery 23 of the disperser plate 12. Between the first projecting parts 14 there are first grooves 14'. The first projecting parts 14 and the first grooves 14' therebetween provide a feed zone 26 being situated next to the inner periphery 22 of the disperser plate 12. The main purpose of the first projecting parts 14 and the first grooves 14' therebetween is to promote a flow of the pulp to be dispersed from the feed opening 21 forward along the dispersing surface 17 without substantially affecting properties of the pulp to be dispersed. A disperser plate 12 according to the solution disclosed herein may also be implemented without any first projecting parts 14.

The dispersing surface 17 of the disperser plate 12 further comprises second projecting parts 15 being situated at a portion of the disperser plate 12 which is located, relative to the feed zone 26, at a side of the outer periphery 23 of the disperser plate 12 and forming a dispersing zone 36 of the disperser plate 12. The second projecting parts 15 are arranged into groups of the second projecting parts 15, each group of the second projecting parts 15 comprising in the examples of FIGS. 2, 3A to 3C and 4, three second projecting parts 15 as disclosed later in more detail in FIGS. 3A to 3C and 4. The groups of the second projecting parts 15 are arranged in a number of concentric annular rows 27*a*, 27*b*, 27*c* that are arranged at different radial positions in the disperser plate 12 in the radial direction RD of the disperser plate 12, i.e. at different radial distances from the inner periphery 22 of the disperser plate 12. In each row 27*a*, 27*b*, 27*c* the adjacent groups of the second projecting parts 15 are arranged at a distance from each other, whereby there are grooves 15' between the adjacent groups of the second projecting parts 15 and another grooves 15" between individual second projecting parts 15. The zone comprising the rows 27*a*, 27*b*, 27*c* of the adjacent groups of the second projecting parts 15 provide a dispersing zone 36 of the disperser plate 12.

In the examples of FIGS. 2, 3A to 3C and 4 there are three adjacent second projecting parts 15 in one group of the second projecting parts 15, but generally one group of the second projecting parts 15 may comprise any number of adjacent second projecting parts 15. In other words, one group of the second projecting parts 15 comprises at least two adjacent second projecting parts 15, whereby there are grooves 15' between the adjacent groups of the second projecting parts 15. Instead of arranging the second projecting parts 15 into groups of the second projecting parts 15, also individual second projecting parts 15 may be arranged adjacent to each other at a distance from each other according to the grooves 15" remaining between individual second projecting parts 15.

In the example of FIG. 2 there are three concentric annular rows 27*a*, 27*b*, 27*c* of the adjacent groups of the second projecting parts 15 but the actual number of these rows may vary. The groups of the second projecting parts 15 are arranged at least partly staggered positions in at least two succeeding annular rows 27*a*, 27*b*, 27*c* of the groups of the second projecting parts 15 in the radial direction RD of the disperser plate 12, whereby a risk of possible clogging of the dispersing surface 17 of the disperser plate may be minimized.

Between the rows 27*a*, 27*b*, 27*c* there are concentric annular cavities 16 or open areas 16, i.e., areas not comprising any projecting parts. These cavities 16 or open areas 16 are thus free from any projecting parts and they provide at the dispersing surface 17 of the disperser plate element 12 a free volume into which the projecting parts in the opposite disperser plate may extend when the disperser plate 12 is installed to the disperser 1.

The disperser plate 12 is a disperser plate for the rotatable disperser disc 10. The disperser plate 4 for the stationary disperser disc is substantially similar reversed image, with the exception that the actual locations of the concentric annular rows of the second projecting parts 7 are different in the radial direction RD of the disperser plate 4 so that the concentric annular rows of the second projecting parts 7, 15 of the opposite plates may intermesh with each other in the radial direction RD of the disperser 1.

FIGS. 3A, 3B, 3C show schematically two neighboring or adjacent second projecting parts 15 of the disperser plate 12 of FIG. 2 in more detail. FIG. 3A shows an end view of the projecting parts 15 as seen from the inner periphery 22 of the disperser plate 12 in FIG. 2, FIG. 3B shows a cross sectional side view of the projecting part 15 along the line A-A of FIG. 3A and FIG. 3C shows a top view of the projecting parts 15 of FIG. 3A. FIG. 4 shows schematically another embodiment of the second projecting parts 15, as shown in a group of three neighboring projecting parts 15. The body of the disperser plate 12 has been omitted in FIGS. 3A-3C and 4.

The second projecting parts 15 comprise a radially inner part 28 having an inclined ascending wall 29 of the projecting part 15 towards the outer periphery 23 of the disperser plate 12, or a front wall 29 if considered in the direction of flow of the pulp on the dispersing surface 17 from the inner periphery 22 towards the outer periphery 23 of the disperser plate 12. The inclined ascending wall 29 thus faces at least partly to the inner periphery 22 of the disperser plate 12 and ascends at least partly towards the outer periphery 23 of the disperser plate 12. The inclined ascending wall 29 of the outer part 28 of the projecting part 15 has an inner end 29*a* facing to the inner periphery 22 of the disperser plate 12 and an outer end 29*b* facing to the outer periphery 23 of the disperser plate 12. The direction of the inclined ascending wall 29 between the inner end 29*a* and the outer end 29*b* corresponds to the longitudinal direction of the inner part 28 and the dimension of the inclined ascending wall 29 between the inner end 29*a* and the outer end 29*b* is determined to be a length of the inclined ascending wall 29, a width of the inclined ascending wall 29 being the dimension of the inclined ascending wall 29 in a direction that is at least partly transversal to a direction of a longitudinal tangent of the inner part 28.

The second projecting parts 15 further comprise an outer part 30 on the side of the outer periphery 23 of the disperser plate 12 relative to the inner part 28. The outer part 30 of the projecting part 15 has an inclined descending wall 31 of the projecting part 15, or a back wall 31 if considered in the direction of flow of the pulp on the dispersing surface 17 from the inner periphery 22 towards the outer periphery 23. The inclined descending wall 31 faces at least partly to the outer periphery 23 of the disperser plate 12 and descends towards the outer periphery 23 of the disperser plate 12. The inclined descending wall 31 of the outer part 30 of the projecting part 15 has an inner end 31*a* facing to the inner periphery 22 of the disperser plate 12 and an outer end 31*b* facing to the outer periphery 23 of the disperser plate 12. The direction of the inclined descending wall 31 between the inner end 31*a* and the outer end 31*b* corresponds to the longitudinal direction of the outer part 30 and the dimension of the inclined descending wall 31 between the inner end 31*a* and the outer end 31*b* is determined to be a length of the inclined descending wall 31, a width of the inclined descending wall 31 being the dimension of the inclined descending wall 31 in a direction that is at least partly transversal to a direction of a longitudinal tangent of the outer part 30.

The inner part 28 and the outer part 30 of the projecting part 15 are radially coupled or interconnected to each other by a ridge 32 along a coupling line CL between the inner part 28 and the outer part 30, the coupling line CL running in a substantially transversal direction relative to the longitudinal directions of the inner part 28 and the outer part 30. The ridge 32 is formed by the outer end 29*b* of the wall 29 and the inner end 31*a* of the wall 31. The sloping walls 29 and 31 are mutually connected only partly so that the ridge 32 is not in common for them entirely, but only a crest section 40 of the ridge 32 is shared by both the inner part 28 and the outer part 30. The crest section 40 connects the two sloping walls 29 and the 31 of the inner and outer part 28 and 30, respectively. The crest section 40 has a length WCL along the coupling line CL.

In the embodiments of FIGS. 3A-3C and 4 the outer end 29*b* of the inclined ascending wall 29 of the inner part 28 is coupled radially to the inner end 31*a* of the inclined descending wall 31 of the outer part 30 by the ridge 32 along the coupling line CL such that the crest section length WCL is less than a width W29 of the outer end 29*b* of the inclined ascending wall 29 of the inner part 28 and less than a width W31 of the inner end 31*a* of the inclined descending wall 31 of the outer part 30 at the coupling line CL between the inner part 28 and the outer part 30 of the projecting part 15.

In the embodiments of FIGS. 3A-3C and 4 the ridge 32 is a sharp shaped edge at which the outer end 29*b* of the inclined ascending wall 29 of the inner part 28 is coupled radially to the inner end 31*a* of the inclined descending wall 31 of the outer part 30. Instead of that the ridge 32 may be a rounded or even substantially planar portion between the inclined ascending wall 29 of the inner part 28 and the inclined descending wall 31 of the outer part 30 and at which the inner part 28 and the outer part 30 are coupled to each other along the coupling line CL, then the ridge 32 is rounded or flat.

In the embodiments of FIGS. 3A-3C and 4 the crest section length WCL is less than a width W29 of the inclined ascending wall 29 of the inner part 28 at the coupling line CL and less than a width W31 of the inclined descending wall 31 at the coupling line CL. However, generally according to the solution disclosed herein it may be defined that the crest section length WCL is less than at least one of a width W29 of the inclined ascending wall 29 of the inner part 28 and a width W31 of the inclined descending wall 31 of the outer part 30 at the coupling line CL between the inner part 28 and the outer part 30 of the projecting part 15. The width W29 of the inclined ascending wall 29 and the width W31 of the inclined descending wall 31 may for example be 5-20 mm, preferably 5-15 mm. The crest section length WCL may for example be 1-15 mm, preferably 1-10 mm.

The positioning of the first part 28 and the second part 30 of the projecting part 15 and the inclined walls 29, 31 thereof as disclosed above causes at least the inclined walls 29, 31 to be dislocated relative to each other in the circumferential direction of the disperser plate 12, what increases a number of course changing points for the pulp flow, thus increasing points or surfaces against which the flowing pulp may collide and cause the contaminant particles in the pulp to be broken into smaller pieces by the effects of these impacts and an internal friction in the pulp. In the disperser plate 12 for the rotatable disperser disc 10 the inclined wall 31 of the second part 30 is dislocated relative to the inclined wall of the first part 28 towards the intended rotation direction R of the rotatable disperser disc 10, as shown in FIGS. 3A-3C and 4.

According to an embodiment of the second projecting part 15, a side of the inner part 28 facing at least partly towards the intended rotation direction R of the rotatable disperser disc 10 forms an inclined side wall 33 ascending at least partly in a direction of the periphery of the disperser plate 12, towards the direction that is opposite to the intended rotation direction R. In the embodiment shown in FIGS. 3A, 3C and 4 the inclined side wall 33 is arranged to ascend in two directions: at least partly towards the outer periphery 23 of the disperser plate 12 and at least partly towards the direction being opposite to the intended rotation direction R of the rotatable disperser disc 10, when the projecting part 15 is at the disperser plate 12 for the rotatable disperser disc 10. The effect of the inclined ascending side wall 33 of the projecting part 15 is to lift or raise the pulp to be dispersed onto the projecting part 15 and towards the dispersing chamber 20 or to intensify the pulp flow over the projecting parts 15, as shown schematically by an arrow P in FIG. 4, for enhancing the mixing of the pulp.

In the embodiment of FIGS. 3A-3C and 4 the ascending walls 29 and 33 and descending walls 31 of the projecting part 15 are inclined in evenly manner but generally at least one of the wall 29, 31, 33 could be inclined in one of evenly, concave and convex manner.

Figure 5:
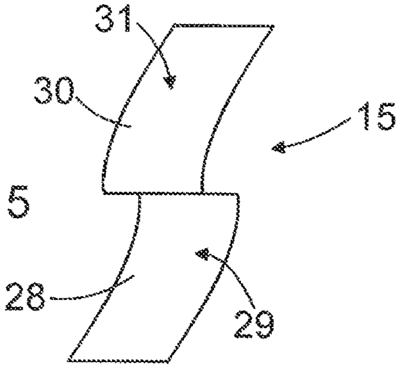
FIGS. 5, 6, 7A and 7B show schematically some further embodiments of the projecting parts.

Furthermore, in the embodiments of FIGS. 3A-3C and 4 the inner part 28 and the outer part 30 of the projecting part 15 are straight in their direction of extension, whereby their imaginary center lines are also straight. According to an embodiment at least one of the inner part 28 and the outer part 30 of the projecting part may be curved in their direction of extension, whereby the imaginary center line of the curved part of the projecting part 15 is also curved. Curved sloped walls could provide a streamlined route for the pulp thus improving its smooth flow. FIG. 5 discloses schematically from above an embodiment of the projecting part 15 wherein both the inner part 28 and the outer part 30 are curved but in opposite directions relative to the radius RD of the disperser plate 12.

Figure 6:
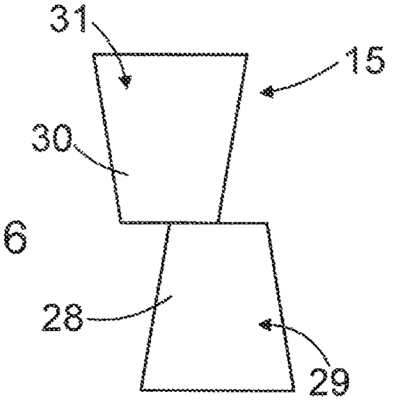

Furthermore, in the embodiments of FIGS. 3A-3C and 4 the width of the inclined walls 29, 31 of the inner 28 and outer 30 parts of the projecting part 15 are substantially constant along their longitudinal direction but the width of the inclined walls 29, 31 of the inner 28 and outer 30 parts of the projecting part 15 may also change along their longitudinal direction. FIG. 6 discloses schematically from above an embodiment of the projecting part 15 wherein the width of the inclined wall 29 of the inner part 28 of the projecting part 15 is arranged to increase from the outer end 29*b* towards the inner end 29*a* and the width of the inclined wall 31 of the outer part 30 of the projecting part 15 is arranged to increase from the inner end 31*a* towards the outer end 31*b*. Especially the broadened inner end 29*a* of the wall 29 would enhance the better collecting of the pulp towards the treatment by the ridge 32.

Figure 7A:
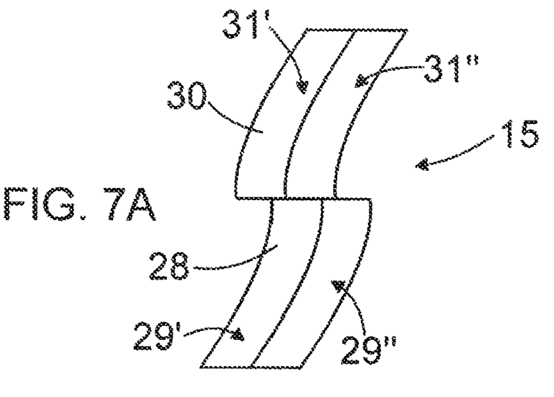
Figure 7B:
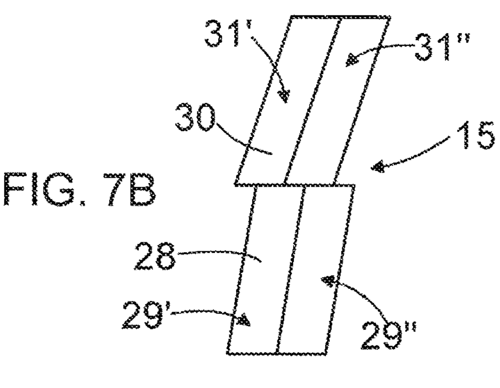

Furthermore, in the embodiments of FIGS. 3A-3C and 4 the inclined walls 29, 31 of the inner 28 and outer 30 parts of the projecting part 15 are substantially planar in the width direction thereof. The embodiments of FIGS. 7A and 7B show schematically from above embodiments of the curved and straight inner 28 and outer 30 parts of the projecting part 15, wherein the inclined walls 29, 31 of the inner 28 and outer 30 parts of the projecting part 15 comprise two different inclined portions 29', 29", 31', 31" in the width direction of the inner 28 and outer 30 parts. The effect of this is to increase an alternating motion of the pulp to be dispersed between the opposite disperser discs 2, 10 in the circumferential direction of the disperser discs 2, 10.

According to an embodiment, as further shown in FIGS. 3A-3C and 4, in the groups of the second projecting parts 15 a bottom of the groove 15" portion remaining between the inner parts 28 of the adjacent second projecting parts 15 comprises an inclined surface arranged to ascend towards the outer periphery 23 of the disperser plate 12, whereby the inclined surface provides a dam 34 remaining between the inner parts 28 of the adjacent second projecting parts 15. The effect of the dam 34 is also to direct the pulp towards the dispersing chamber 20 and somewhat also to slow down a speed of the flow of the pulp toward the outer periphery 23 of the disperser plate 12, and thereby even out some possible differences in the speed of the flow of the pulp at the dispersing surface 17, and thereby improving homogeneity of the dispersed pulp. The dam 34 may be a half-dam 34 like in FIG. 3B, wherein the dam 34 extends about half of the maximum height of the second projecting part 15. Alternatively, the dam 34 may be a full dam 34, wherein the dam 34 extends about the same height as is the maximum height of the second projecting part 15. Preferably there is a dam 34 between each projecting part 15 in the group of the second projecting parts 15, so that the projecting parts in that group are sideways connected to each other via dams 34, and the coupling line CL is then formed by a top profile of the outer ends 29*b* of the inner walls 29 and the inner ends 31*a* of the outer walls 31 and the outer wall(s) 35 of the dam(s) 34.

According to an embodiment, as further shown in FIG. 3B, the inclined ascending surface of the bottom of the groove 15" portion providing the dam 34 is arranged to end with a steep, substantially vertical drop, whereby there is a substantially vertical wall 35 between the adjacent second projecting parts 15, the wall 35 facing at least partly towards the outer periphery 23 of the disperser plate 12. The effect of the wall 35 is to prevent a back flow of steam toward the inner periphery 22 of the disperser plate 12, i.e. towards the feed of the pulp, thereby providing a more stable operation of the disperser 1 and an improved dispersing result.

According to an embodiment, a width of a groove 15" portion remaining between the outer parts 30 of the adjacent second projecting parts 15 may be arranged to decrease towards the outer periphery 23 of the disperser plate 12. The effect of this is to equalize open surface area between the inner 22 and outer 23 peripheries of the disperser plate 12, which even out the flow of the pulp to be dispersed on the dispersing surface 17 of the disperser plate 12.

In the embodiment of FIG. 2 the feed zone 26 were provided with elongated first projecting parts 14 but the second projecting parts 15 disclosed herein may also be utilized at the feed zone 26. According to an embodiment the feed zone 26 does not disclose any projecting parts.

The disperser 1 disclosed above is an example of a device for mechanically processing lignocellulose-containing fibrous material, in this case pulp made of recycled waste paper and/or packaging material, and the disperser discs and the disperser plates thereof provide the respective processing or treatment discs and processing or treatment plates for mechanically processing or treating the pulp.

Another example of the device for mechanically processing or treating lignocellulose-containing fibrous material is a medium or high consistency refiner intended for defibration of the lignocellulose-containing fibrous material to produce refined pulp. The lignocellulose-containing fibrous material in this case is typically a mixture of water and wood chips having a consistency between about 10% and about 25% for medium consistency refiners and above 25% or above 30% in high consistency refiners, for example. The general construction and operation of the refiner is substantially similar to that of the disperser, thus, all the features disclosed above in connection with a disperser are applicable with a refiner, too.

It will be obvious to a person skilled in the art that, as the technology advances, the inventive concept can be implemented in various ways. The invention and its embodiments are not limited to the examples described above but may vary within the scope of the claims.

The invention claimed is:

1. A processing plate for a device for mechanically processing lignocellulose-containing fibrous material, the processing plate comprising:

portions forming a front surface, the front surface having an inner periphery and an outer periphery and defining a radial direction from the inner periphery to the outer periphery, the front surface forming a processing surface having projecting parts formed thereon;

wherein at least some of the projecting parts comprise a radially inner part having an inclined ascending wall towards the outer periphery of the processing plate and a radially outer part having an inclined descending wall towards the outer periphery of the processing plate;

wherein the radially inner part and the radially outer part are radially coupled to each other by a ridge along a coupling line between the radially inner part and the radially outer part and wherein the inclined ascending wall and the inclined descending wall are mutually connected only partly so that they have in common only a crest section of the ridge which defines a width of the crest section;

wherein the radially inner part inclined ascending wall defines a first width where it joins the crest section and the radially outer part inclined descending wall defines a second width where it joins the crest section; and wherein the width of the common crest section is less than at least one of: the first width and the second width.

2. The processing plate of claim 1 wherein the width of the crest section is less than the first width and the second width.

3. The processing plate of claim 1 wherein the projecting parts are arranged into groups of projecting parts, each group of the projecting parts comprising a plurality of projecting parts arranged adjacent to each other and groups of projecting parts are spaced from each other along a circumferential direction of the processing plate.

4. The processing plate of claim 3 further comprising a dam formed by an inclined ascending surface extending towards the outer periphery of the processing plate and positioned between and connecting a pair of at least two adjacent radially inner parts in a circumferential direction of the processing plate.

5. The processing plate of claim 4 wherein a dam is positioned between each two adjacent radially inner parts of the group of the projecting parts.

6. The processing plate of claim 4 wherein the dam terminates at a steep substantially vertical drop such that there is a substantially vertical wall between the at least two adjacent projecting parts, the vertical wall facing at least partly towards the outer periphery of the processing plate.

7. The processing plate of claim 3 wherein the projecting parts on the front surface of the processing plate are arranged in a plurality of at different radial distances on the processing plate.

8. The processing plate of claim 3 wherein the groups of the projecting parts are arranged at least partly in staggered positions in at least two succeeding rows of the groups of the projecting parts in the radial direction of the processing plate.

9. The processing plate of claim 3 wherein the radially outer parts define grooves between adjacent projecting parts, wherein the grooves have a width which decreases towards the outer periphery of the processing plate.

10. The processing plate of claim 1 wherein the processing plate comprises first elongated projecting parts closest to the inner periphery of the processing plate and second projecting parts comprising the radially inner part and the radially outer part positioned between the first elongated projecting parts and the outer periphery of the processing plate.

11. The processing plate of claim 1 wherein the processing plate has a feed zone formed by first elongated projecting parts and positioned on the side of the outer periphery of the processing plate and a processing zone formed by the second projecting parts.

12. The processing plate of claim 1 wherein the processing plate is a disperser plate for a disperser for dispersing lignocellulose-containing fibrous material.

13. The processing plate of claim 1 wherein the processing plate is a refiner plate for a consistency of lignocellulose-containing fibrous material between about 10% and more than 30% which is used to produce refined pulp.

14. A device for mechanically processing lignocellulose-containing fibrous material, the device comprising:

at least two oppositely positioned processing discs at least one of the processing discs being arranged to be rotated relative to at least one other processing disc, each processing disc having at least one processing plate attached thereto, the processing plates having processing surfaces provided with projecting parts, each processing surface having an inner periphery and an outer periphery and defining a radial direction from the inner periphery to the outer periphery;

wherein at least some of the projecting parts comprise a radially inner part having an inclined ascending wall towards the outer periphery of the processing plate and a radially outer part having an inclined descending wall towards the outer periphery of the processing plate;

wherein the radially inner part and the radially outer part are radially coupled to each other by a ridge along a coupling line between the radially inner part and the radially outer part and wherein the inclined ascending wall and the inclined descending wall are mutually connected only partly so that they have in common only a crest section of the ridge which defines a width of the crest section;

wherein the radially inner part inclined ascending wall defines a first width at the crest section and the radially outer part inclined descending wall defines a second width at the crest section; and wherein the width of the crest section is less than at least one of: the first width and the second width.

15. The device of claim 14 wherein the device is a disperser for dispersing pulp.

16. The device of claim 14 containing lignocellulose-containing fibrous material having a consistency of lignocellulose-containing fibrous material of a consistency of greater than about 10%.

17. The device of claim 14 wherein the width of the crest section is less than the first width and the second width.

18. The device of claim 14 wherein projecting parts on the processing surfaces are arranged into groups of projecting parts, each group of the projecting parts comprising a plurality of projecting parts arranged adjacent to each other and groups of projecting parts are spaced from each other along a circumferential direction of the processing plate and form a plurality of concentric annular rows at different radial distances on the processing plates with open areas between concentric annular rows to receive the projecting parts from the other of the at least two oppositely positioned processing discs.

19. The device of claim 14 wherein the processing surfaces have a feed zone formed by first elongated projecting parts closest to the inner periphery of the processing surfaces and a processing zone formed by the second projecting parts between the feed zone and the outer periphery of the processing surfaces.

20. The device of claim 14 wherein the processing surfaces have a dam between each two adjacent radially inner parts formed by an inclined ascending surface, extending toward the outer periphery of the processing surfaces, the dams positioned between and connecting a pair of at least two adjacent radially inner parts in a circumferential direction of the processing surface.

* * * * *